(12) United States Patent
Mathew et al.

(10) Patent No.: US 7,188,134 B2
(45) Date of Patent: Mar. 6, 2007

(54) HIGH-PERFORMANCE ADDER

(75) Inventors: Sanu K. Mathew, Hillsboro, OR (US); Ram K. Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 465 days.

(21) Appl. No.: 09/967,240

(22) Filed: Sep. 28, 2001

(65) Prior Publication Data

US 2003/0065700 A1    Apr. 3, 2003

(51) Int. Cl.
  *G06F 7/50*    (2006.01)
(52) U.S. Cl. ..................................... 708/714
(58) Field of Classification Search ......... 708/700–714
  See application file for complete search history.

(56) References Cited

U.S. PATENT DOCUMENTS

| | | | | | |
|---|---|---|---|---|---|
| 3,553,446 | A | * | 1/1971 | Kruy | 708/714 |
| 3,993,891 | A | * | 11/1976 | Beck et al. | 708/714 |
| 5,047,976 | A | * | 9/1991 | Goto et al. | 708/714 |
| 5,257,218 | A | * | 10/1993 | Poon | 708/714 |
| 5,327,369 | A | * | 7/1994 | Ashkenazi | 708/714 |
| 5,450,560 | A | * | 9/1995 | Bridges et al. | 708/710 |
| 5,701,504 | A | * | 12/1997 | Timko | 708/710 |
| 6,269,386 | B1 | * | 7/2001 | Siers et al. | 708/710 |
| 6,496,846 | B1 | * | 12/2002 | Bradley | 708/710 |
| 6,782,406 | B2 | * | 8/2004 | Koshy | 708/710 |

OTHER PUBLICATIONS

Cheng et al., the improvement of conditional sum adder for low power applications, 1998, IEEE, p. 131-134.*
Jien-Chung Lo A fast bianry adder with conditional carry generation, Feb. 1997, IEEE Transactions on computers, vol. 46, No. 2, pp. 248-253.*
Woo, R., et al., "A 670ps, 64bit Dynamic Low-Power Adder Design", *IEEE International Symposium on Crcuits and Systems*, Geneva, Switzerland, pp. I-28-I31, (May 28-31, 2000).

* cited by examiner

*Primary Examiner*—Kakali Chaki
*Assistant Examiner*—Chat C. Do
(74) *Attorney, Agent, or Firm*—Schwegman, Lundberg, Woessner & Kluth, P.A.

(57) ABSTRACT

An adder for use in summing two binary numbers in an arithmetic logic unit of a processor. The adder includes a sparse carry-merge circuit adapted to generate a first predetermined number of carries and a plurality of intermediate carry generators coupled to the sparse carry merge circuit and adapted to generate a second predetermined number of carry signals. The adder further includes a plurality of conditional sum generators coupled to the intermediate carry generators and to the sparse carry-merge circuit to provide the sum of the two binary numbers. The adder may also include a multiplexer recovery circuit that enables a single rail dynamic implementation of the adder core.

32 Claims, 9 Drawing Sheets

HIGH-PERFORMANCE ADDER

FIELD OF THE INVENTION

The present invention relates generally to adder circuits, and more particularly to a high performance, robust sparse carry-merge adder circuit.

BACKGROUND INFORMATION

All processors, microprocessors or central processing units include arithmetic logic units (ALU) to perform calculations involving integers. An ALU will contain a multiplicity of adder circuits or simply adders to perform the arithmetic calculations by summing two binary numbers together. The binary numbers being added will typically contain either 32 bits or 64 bits. Accordingly, adders will typically be of two types of design or architecture, one to handle the summation of 32 bit binary numbers and another to handle the summation of 64 bit binary numbers.

Adders are generally used by the majority of instructions in controlling the operations of a computer system, microprocessor or the like and are performance limiting devices in such systems because they form a core of several critical paths in performing instructions and calculations. A typical adder circuit can include over 500 logic gates and will generate a carry for every two bits summed together for two 64 bit or 32 bit binary numbers. Accordingly, 64 summations and carries are generated in parallel operations. While the time period during which these arithmetic operations are performed is extremely fast, a simpler architecture with fewer gates would perform fewer operations in a much shorter time period. A larger number of logic gates and a longer period of time to perform operations will also result in more power consumption.

Additionally, the more complex adder circuit with hundreds of logic gates requires additional and more complex wiring to interconnect the hundreds of gates and will also occupy a considerable area or real estate on a semiconductor chip.

Another issue with some adders that use a multiplexer to select between different conditional sums or conditional carries is that a conditional sum or conditional carry input to the multiplexer may be erroneously discharged that could result in a later arriving true conditional sum input or true conditional carry input to the multiplexer not being evaluated correctly.

Accordingly, for the reason stated above, and for other reasons that will become apparent upon reading and understanding the present specification, there is a need for a robust, high performance adder with a simplified architecture, that occupies less area on a semiconductor chip and that operates faster and with less power consumption and is not subject to incorrect evaluation of conditional sums and conditional carries.

BRIEF DESCRIPTION OF THE DRAWINGS

In the drawings, like numerals describe substantially similar components throughout the several views.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
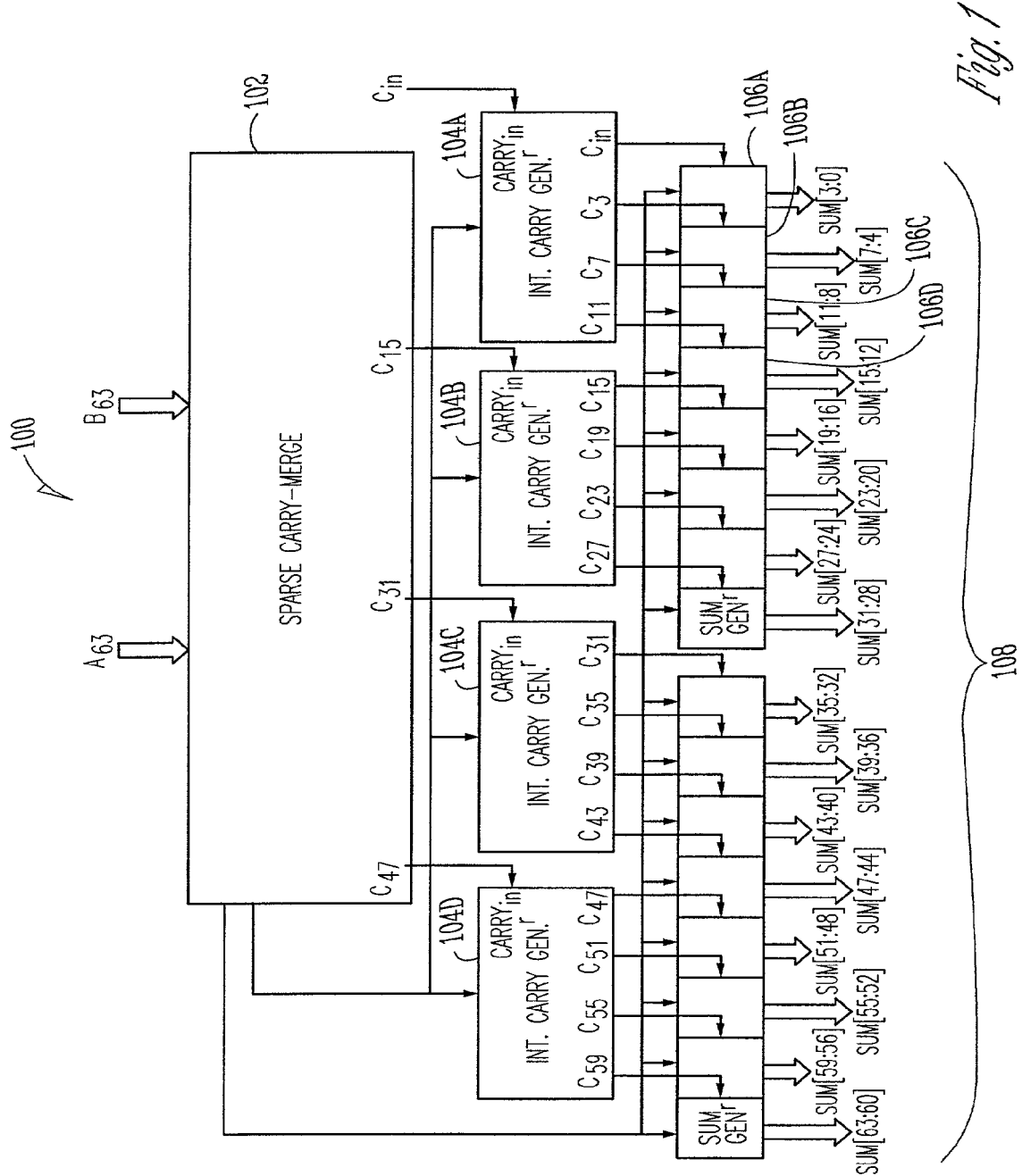
FIG. 1 is a block schematic diagram of a 64 bit quarternary-tree adder in accordance with the present invention.

Referring initially to FIG. 1, a quarternary-tree adder 100 in accordance with the present invention is shown for summing two 64 bit (bits 0 to 63) binary numbers, $A_{63}$ and $B_{63}$. The adder 100 includes a first circuit or a sparse carry-merge tree or circuit 102 into which the binary numbers, $A_{63}$ and $B_{63}$, are inputted. The sparse carry-merge circuit 102 is adapted to generate a first predetermined number or group of carries or carry signals, $C_{15}$, $C_{31}$ and $C_{47}$. The sparse carry-merge circuit 102 generates one (1) in sixteen (16) carries or will generate one (1) carry for each group of sixteen (16) bits of the 64 bit binary numbers grouping the bits together starting with a least significant digit or bit zero (0), $A_0$ and $B_0$. Accordingly, for the 64 bit adder 100 the three carries $C_{15}$, $C_{31}$ and $C_{47}$ will be generated.

The sparse carry-merge circuit 102 is coupled to a plurality of second circuits or intermediate carry generators 104 adapted to generate a second predetermined number of carries or the missing one (1) in four (4) carries or carry signals from the first predetermined number or group of carries or carry signals. Accordingly, a first intermediate carry generator 104A will generate missing 1 in 4 carries $C_3$, $C_7$, and $C_{11}$, using a carry-in ($C_{in}$) which is passed through the first intermediate carry generator 104A. $C_{in}$ can be a 0 or a 1. The second intermediate carry generator 104B will generate missing 1 in 4 carries $C_{19}$, $C_{23}$, and $C_{27}$ using carry $C_{15}$ from the first predetermined number of carries as a carry-in as will be described in more detail below. The third intermediate carry generator 104C will generate missing 1 in 4 carries $C_{35}$, $C_{39}$, and $C_{43}$ using carry $C_{31}$ as a carry-in, and the fourth intermediate carry generator 104D will generate missing 1 in 4 carries $C_{51}$, $C_{55}$ and $C_{59}$ using $C_{47}$ as a carry-in. The intermediate carry generators 104, therefore, generate the additional carries or carry signals such that one carry is generated for every group of four bits of the two binary numbers, grouping the bits together beginning with the least significant digit or bit 0.

The adder 100 further includes a third circuit or plurality of sum generators 106 coupled to the intermediate sum generators 104 and the sparse carry-merge circuit 102 to provide a final sum 108 of the two binary number $A_{63}$ and $B_{63}$. As will be described in more detail below, each sum generator 106 computes a sum for a group of four bits of the two binary number $A_{63}$ and $B_{63}$ using one of the one in four carries (or one of the first and second predetermined number of carries). For example, the first conditional sum generator 106A will compute a Sum(3:0) generated from bits 0–3 of the two binary numbers $A_{63}$ and $B_{63}$ using carry-in ($C_{in}$). Similarly, the second conditional sum generator 106B will compute a Sum(7:4) generated from bits 4–7 of the two binary numbers using carry $C_3$ as the carry-in and so forth for the other conditional sum generators 106 shown in FIG. 1.

Figure 2:
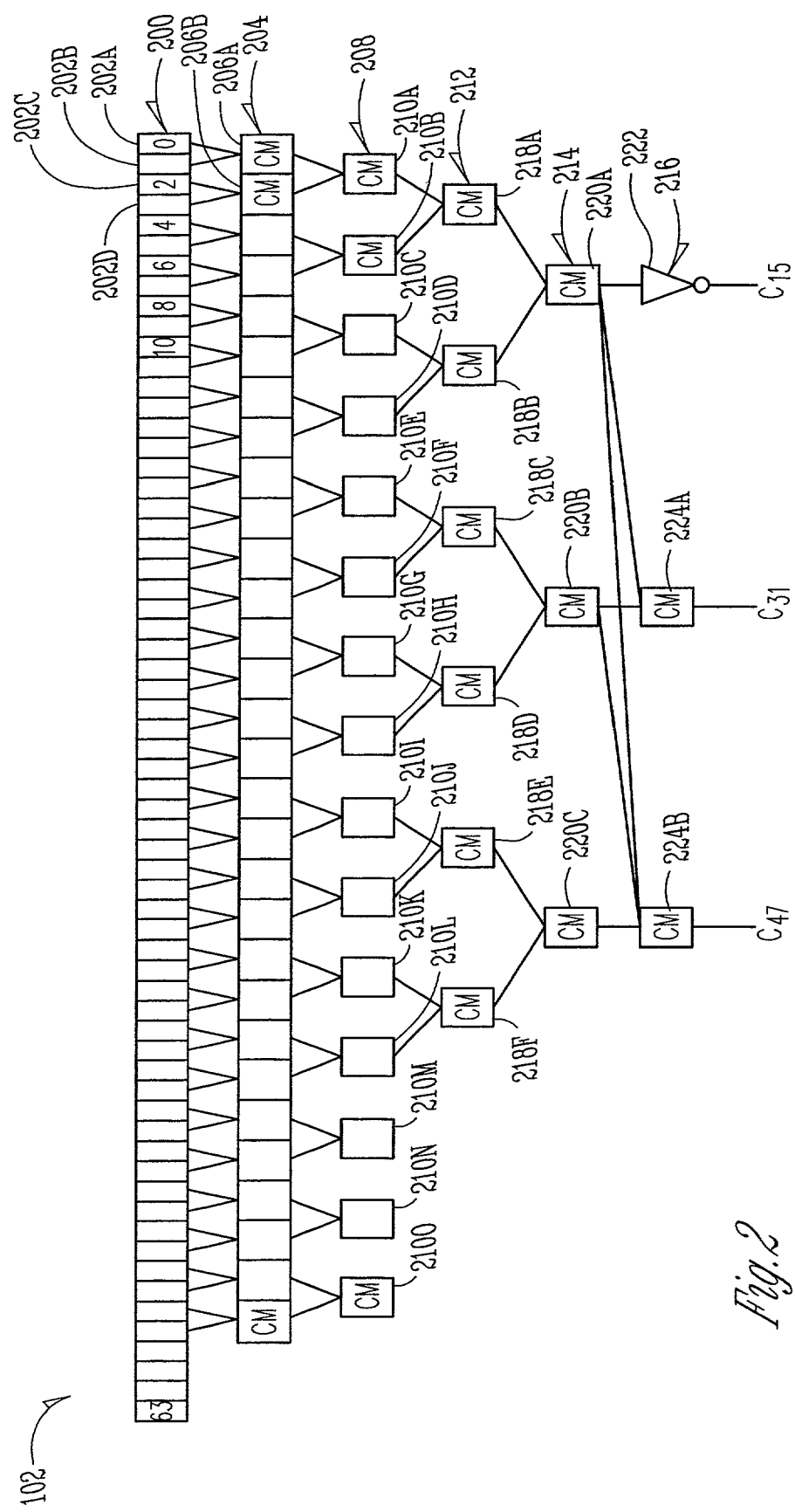
FIG. 2 is a block schematic diagram of a sparse carry-merge circuit in accordance with the present invention.

Referring also to FIG. 2, which is a detailed block schematic diagram of the sparse carry-merge tree or circuit 102 in accordance with the present invention, the sparse carry-merge circuit 102 includes a first stage 200 to merge each of the bits 0–63 of the two binary numbers $A_{63}$ and $B_{63}$ together. The first stage 200 of the sparse carry-merge circuit 102 includes a plurality of logic gates 202 represented by the blocks in the first stage 200 to generate a plurality of propagate signals $P_i$ (where i=0, 63) and a plurality of generate signals $G_i$ (where i=0, 63). The logic gates 202 each perform an "exclusive OR" logic operation on each pair of the bits 0–63 of the binary numbers $A_{63}$ and $B_{63}$ to generate the plurality of propagate signals ($P_i=A_i \oplus B_i$) and the logic gates 202 also each perform an "AND" logic operation on each pair of bits of the two binary numbers $A_{63}$ and $B_{63}$ to generate the plurality of generate signals ($G_i=A_i \cdot B_i$).

The sparse carry-merge circuit 102 also includes a second stage 204 including a plurality of carry-merge (CM) logic gates 206 (represented by each of the blocks in the second stage 204). Each CM logic gate 206 is coupled to two adjacent logic gates 202 of the first stage 200 and will merge the two propagate signals ($P_i$ and $P_{i-1}$) and the two generate signals ($G_i$ and $G_{i-1}$) from the two adjacent logic gates 202 of the first stage 200. The logic equation of the CM logic gate 206 for an output propagate signal is $P_{out}=P_i \cdot P_{i-1}$ and the logic equation of the CM logic gate 206 for an output generate signal is $G_{out}=G_i+P_i \cdot G_{i-1}$. Accordingly, the first CM logic gate 206A will merge the propagate signal $P_0$ and generate signal $G_0$ from the first logic gate 202A of the first stage 200 with the propagate signal $P_1$ and the generate signal $G_1$ of the second logic gate 202B of the stage 200. Similarly, the second CM logic gate 206B of the second stage 204 will merge the propagate signal $P_2$ and generate signal $G_2$ of the third logic gate 202C with the propagate signal $P_3$ and the generate signal $G_3$ of the fourth logic gate 202D of the first stage 200 and so forth for each of the CM logic gates 206 in the second stage 204.

A third stage 208 of the sparse carry-merge circuit 102 is coupled to the second stage 204 of the circuit 102. The third stage 208 includes a second plurality of CM logic gates 210. Similar to the relationship of the second stage 204 and the first stage 200, each CM gate 210 of the third stage 208 is coupled to two adjacent CM logic gates 206 of the second stage 204 to merge the two propagate signals ($P_i$ and $P_{i-1}$) and the two generate signals ($G_i$ and $G_{i-1}$) from the two adjacent CM logic gates 206 of the second stage 204.

The sparse carry-merge circuit 102 further includes a fourth stage 212, a fifth stage 214 coupled to the fourth stage 212 and a sixth stage 216 coupled to the fifth stage 214 to generate the 1 in 16 carries $C_{15}$, $C_{31}$ and $C_{47}$ for the two binary numbers $A_{63}$ and $B_{63}$. The fourth stage 212 includes a plurality of CM logic gates 218. Each CM logic gates 218 of the fourth stage 212 is coupled to two adjacent CM logic gates 210 of the third stage 208 and merges the two propagate signals ($P_i$ and $P_{i-1}$) and the two generate signals ($G_i$ and $G_{i-1}$) from the two adjacent CM logic gates 210.

Thus the CM gate 218A will merge the signals from the CM gates 210A and 210B, the CM gate 218B will merge signals from the CM gates 210C and 210D, and so forth for the other CM gates 218 of the fourth stage 212. Similarly, the fifth stage 214 includes a plurality of CM gates 220 that are each coupled to two adjacent CM gates 218 of the fourth stage 212 for merging the propagate signals ($P_i$ and $P_{i-1}$) and the generate signals ($G_i$ and $G_{i-1}$) from each pair of adjacent CM gates 218 of the fourth stage 212. The sixth stage 216 includes an inverter 222 and two CM gates 224A and 224B. The inverter 222 is coupled to the first CM gate 220A of the fifth stage 214. The output signal of the inverter 222 provides the first 1 in 16 carry $C_{15}$ of the first predetermined number of carries. The first CM gate 224A of the sixth stage 216 is coupled to the first CM gate 220A and the second CM gate 220B of the fifth stage 214. The first CM gate 224A merges the propagate signal $P_i$ and the generate signal $G_i$ from the second CM gate 220B of the fifth stage 214 with the generate signal $G_{i-1}$ from the first CM gate 220A of the fifth stage 214 to provide the second 1 in 16 carry $C_{31}$ of the first predetermined number of carries. The second CM gate 224B of the sixth stage 216 is coupled to the first CM gate 220A, the second CM gate 220B and the third CM gate 220C of the fifth stage 214. Accordingly, the second CM gate 224B merges the propagate signal $P_i$ and the generate signal $G_i$ from the third CM gate 220C with the generate signal $G_{i-1}$ from the second CM gate 220B and the generate signal $G_{i-2}$ from the first CM gate 220A of the fifth stage 214 to provide the third 1 in 16 carry $C_{47}$ of the first predetermined number of carries.

Figure 3:
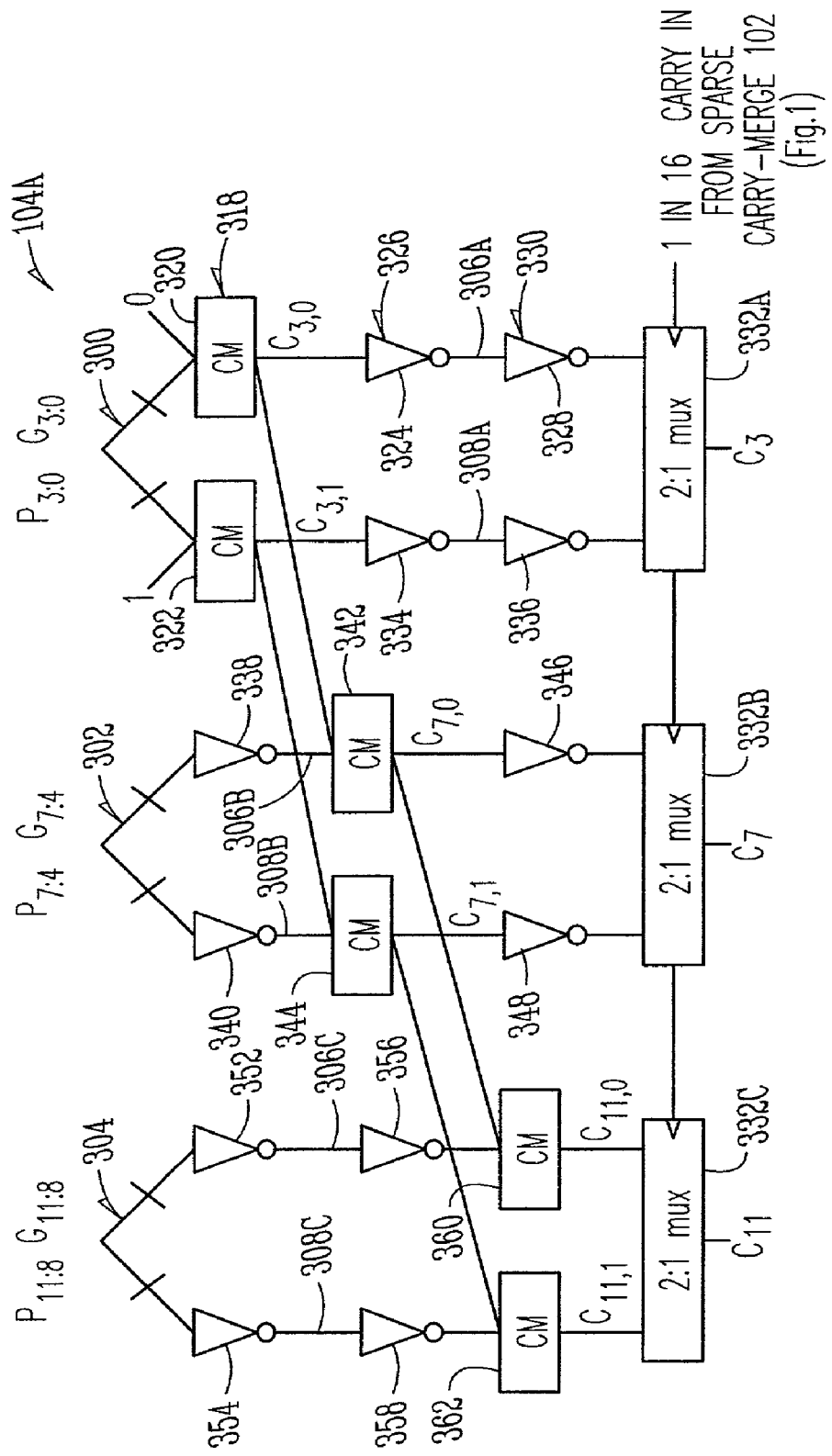
FIG. 3 is a block schematic diagram of an intermediate carry generator in accordance with the present invention.

The architecture and operation of the first intermediate carry generator 104A will be described with reference to FIG. 3 which is a schematic diagram of an example of an intermediate carry generator 104. The structure and operation of the other intermediate carry generators 104 will be analogous to that described with respect to the first intermediate carry generator 104A. The intermediate carry generators 104 will receive respective, merged propagate and generate signals from the third stage 208 of the sparse carry-merge circuit 102 (FIG. 2) to generate additional carries or the missing 1 in 4 carries. The first intermediate carry generator 104A includes a first carry generate circuit 300, a second carry generate circuit 302 and a third carry generate circuit 304. Each of the carry generate circuits 300, 302 and 304 includes two rails or sub-circuits 306 and 308 to generate a pair of conditional carries in each circuit 300, 302 and 304. The first rails 306 of each circuit 300, 302 and 304 generate a conditional carry assuming a logic 0 carry-in signal to the intermediate carry generator 104A and the second rails 308 of each circuit 300, 302 and 304 generate an associated conditional carry assuming a logic 1 carry-in signal to the intermediate carry generator 104.

The intermediate carry generator 104A further includes 3 stages of ripple-carry logic formed by the first and second rails 306 and 308 of the circuits 300, 302 and 304. A first stage 318 of the first circuit 300 of the intermediate carry generator 104A will receive a propagate signal $P_{3:0}$ and an associated generate signal $G_{3:0}$ from the third stage 208 of the sparse carry-merge circuit 102. The propagate signal $P_{3:0}$ and the associated generate signal $G_{3:0}$ will be generated in the sparse carry-merge circuit 102 by merging bits 0–3 of the two binary number $A_{63}$ and $B_{63}$ as previously described. A first CM gate 320 in the first rail 306A of the first circuit 300 will merge the propagate signal $P_{3:0}$ and the associated generate signal $G_{3:0}$ with the assumed logic 0 carry-in signal in the first stage 318 to generate a resulting conditional carry $C_{3,0}$. A second CM gate 322 of the first circuit 300 in the second rail 308A will merge the propagate signals $P_{3:0}$ and the associated generate signal $G_{3:0}$ with the assumed logic 1 carry-in to generate a resulting conditional carry $C_{3,1}$ in the first stage 318 of the first circuit 300. The first CM gate 320 is coupled to a first inverter 324 in a second stage 326 of the first rail 306A of the intermediate carry generator 104A and the first inverter 324 is coupled to a second inverter 328 in a third stage 330 of the intermediate carry generator 104A. The second inverter 328 is coupled to a 2:1 multiplexer 332A. Similarly, the second CM gate 322 is coupled to a first inverter 334 of the second rail 308A in the second stage 326 and the first inverter 334 is coupled to a second inverter 336 of the second rail 308A in the third stage 330. The second inverter 336 is coupled to the multiplexer 332A. The multiplexer 332A receives a carry-in ($C_{in}$ in FIG. 1) and selects the first rail 306A or the second rail 308A to provide the missing 1 of 4 carries of the second predetermined number of carries. For the first carry generate circuit 300 of the intermediate carry generator 104a, the missing 1 of 4 carries is designated $C_3$.

The second circuit 302 of the intermediate carry generator 104A receives merged propagate signal $P_{7:4}$ and merged generate signal $G_{7:4}$ from the third stage 208 of the sparse carry-merge circuit 102 (FIG. 2). The propagate signal $P_{7:4}$ and the generate signal $G_{7:4}$ are generated from bits 4–7 of the two binary number $A_{63}$ and $B_{63}$ in the same manner as that described above for signals $P_{3:0}$ and $G_{3:0}$. The signals $P_{7:4}$ and $G_{7:4}$ are inverted in the first stage 318 by an inverter 338 in the first rail 306B and an inverter 340 in the second rail 308B. In the second stage 326, the first rail 306B includes a first CM gate 342 and the second rail 308B includes a second CM gate 344. The first CM gate 342 is coupled to the first inverter 338 and to the first CM gate 320 of the first circuit 300. The first CM gate 342 merges the inverted $P_{7:4}$ and $G_{7:4}$ signals with the conditional carry $C_{3,0}$ from the first CM gate 320 of the first circuit 300 to generate a first conditional carry $C_{7,0}$. The second CM gate 344 merges the inverted $P_{7:4}$ and $G_{7:4}$ signals with the conditional carry $C_{3,1}$ from the second CM gate 322 of the first circuit 300 to generate a second conditional carry $C_{7,1}$.

The third stage 330 of the second circuit 302 includes an inverter 346 in the first rail 306B coupled to the first CM gate 342 and another inverter 348 in the second rail 308B coupled to the second CM gate 344. The outputs of both inverters 346 and 348 are coupled to a 2:1 multiplexer 332B. As with the first circuit 300, the multiplexer 332B selects between the conditional signals generated by the first rail 306B and the second rail 308B in response to one of the carry-in signals of the first predetermined number of carries or in response to one of the 1 in 16 carries from the sparse carry-merge circuit 102 to provide a second one of the missing 1 in 4 carries of the second predetermined number of carries. In the case of the second circuit 302 of the first intermediate carry generator 104A, the missing 1 in 4 carry is designated $C_7$.

The third circuit 304 of the intermediate carry generator 104A receives merged propagate signal $P_{11:8}$ and merged generate signal $G_{11:8}$ from the third stage 208 of the sparse carry-merge circuit 102. The propagate signal $P_{11:8}$ and the generate signal $G_{11:8}$ are generated from bits 8–11 of the two binary numbers $A_{63}$ and $B_{63}$ in the same manner as that described above for signals $P_{3:0}$, $G_{3:0}$ and $P_{7:4}$, $G_{7:4}$. The first and second stages 320 and 326 of the first rail 306C and the second rail 308C of the third circuit 304 are inverters 352, 354, 356 and 358. The third stage 330 of the third circuit 304 includes a first CM gate 360 in the first rail 306C and a second CM gate 362 in the second rail 308C. The first CM gate 360 is coupled to the inverter 356 and to the first CM gate 342 in the second stage 326 of the second circuit 302. The second CM gate 362 is coupled to the inverter 358 and the second CM gate 344 of the second circuit 302. The first CM gate 360 merges the $P_{11:8}$ and $G_{11:8}$ signals with the conditional carry $C_{7,0}$ from the first CM gate 342 of the second circuit 302 to generate a first conditional carry $C_{11,0}$. The second CM gate 362 merges the $P_{11:8}$ and $G_{11:8}$ signals with the conditional carry $C_{7,1}$ from the second CM gate 344 of the second circuit 302 to generate a second conditional carry $C_{11,1}$. The first CM gate 360 and the second CM gate 362 are each coupled to a 2:1 multiplexer 332C. Similar to circuits 300 and 302, the multiplexer 332C will select between the conditional signals generated by the first rail 306C and the second rail 308C to provide a third one of the second predetermined number of carries or a third one of the missing 1 in 4 carries. In the case of the third circuit 304 of the first intermediate carry generator 104A, the missing 1 in 4 carry is designated $C_{11}$. As previously discussed, the second, third and fourth intermediate carry generators 104B, 104C and 104D have a similar structure and will operate in the same manner as just described with respect to the first intermediate carry generator 104A. The intermediate carry generators 104A–D collectively generate the second predetermined number of carries or the missing 1 in 4 carries as illustrated in FIG. 1. The intermediate carry generator 104A generates carries $C_3$, $C_7$ and $C_{11}$ as described above. Similarly to the intermediate carry generator 104A, the intermediate carry generator 104B generates carries $C_{19}$, $C_{23}$ and $C_{27}$, the intermediate carry generator 104C generates carries $C_{35}$, $C_{39}$ and $C_{43}$ and the intermediate carry generator 104D generates carries $C_{51}$, $C_{55}$ and $C_{59}$ as shown in FIG. 1.

As described with reference to FIG. 3, the CM logic gates 320, 322, 342, 344, 360 and 362 are in a lower or later stage 318, 326 and 330 in each subsequent circuit 300, 302 and 304 to define the ripple carry-merge logic for generating the two rails of conditional 1 in 4 carries in each circuit 300, 302 and 304.

Figure 4:
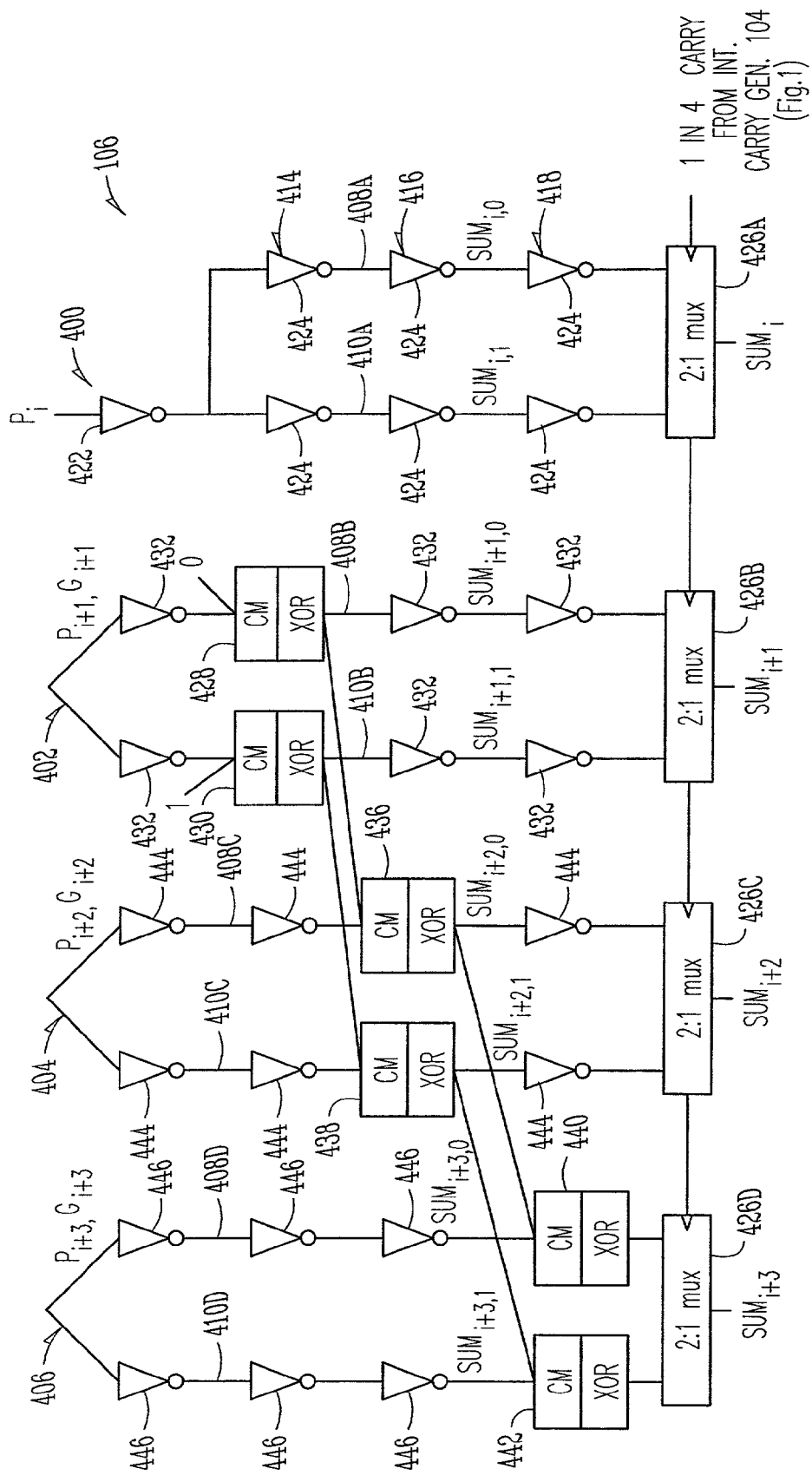
FIG. 4 is a block schematic diagram of a conditional sum generator in accordance with the present invention.

FIG. 4 is a block schematic diagram of an example of a single conditional sum generator 106 of FIG. 1. The sum generator 106 includes four circuits 400, 402, 404 and 406. Each circuit 400, 402, 404 and 406 includes a first rail 408 and a second rail 410 and has four stages 412, 414, 416 and 418. The sum generator 106 is also arranged in a ripple carry-merge structure similar to the intermediate carry gate 104A of FIG. 3. The first stage 412 of the first circuit 400 includes an inverter 422 that is coupled to the first rail 408A and to the second rail 410A. The other stages 414, 416 and 418 of the first circuit 400 also include inverters 424 in the first and second rails 408A and 410A. The inverter 422 of first stage 412 of the first circuit 400 will receive a first propagate signal $P_i$ from the first stage 200 of the sparse carry-merge circuit 102 in FIG. 2. The first rail 408A will then generate a first conditional sum, $sum_{i,0}$, and the second rail 410A will generate a second conditional sum, $sum_{i,1}$. The inverters 424 of the fourth stage 418 of each rail 408A and 410A are both coupled to a 2:1 multiplexer 426A. The multiplexer 426A will select between the conditional sums, $sum_{i,0}$ and $sum_{i,1}$ of the first rail 408A and the second rail 410A in response to one of the 1 in 4 carries or one of the predetermined number of combined first and second carries to provide a final sum, $sum_i$. For example, referring back to FIG. 1, for the final $sum_i$ where i equals zero (0) the carry-in will be $C_{in}$ and the $P_i$ input signal to the first circuit 400 will be $P_0$ from the first stage 200 of the sparse carry-merge circuit 102 (FIG. 2).

The second circuit 402 includes a first combination CM/exclusive OR logic gate 428 in the second stage 414 of the first rail 408B and a second combination CM/exclusive OR logic gate 430 in the second stage 414 of the second rail 410B. The first stage 412, third stage 416 and fourth stage 418 of the first and second rails 408B and 410B of the second circuit 402 include inverters 432. The first combination CM/exclusive OR logic gate 428 will merge signals $P_{i+1}$ and $G_{i+1}$ with an assumed logic 0 carry-in to generate a conditional sum, $sum_{i+1,0}$. The second combination CM/exclusive OR gate 430 will merge signals $P_{i+1}$ and $G_{i+1}$ with an assumed logic 1 carry-in to generate a conditional sum, $sum_{i+1,1}$. The inverters 432 of the fourth stage 418 of the second circuit 402 are both coupled to a 2:1 multiplexer 426B. The multiplexer 426B selects between the two conditional sums, $sum_{i+1,0}$ and $sum_{i+1,1}$, generated by the first and second rails 408B and 410B of the second circuit 402 in response to one of the 1 in 4 carries to provide the final sum, $sum_{i+1}$.

The third circuit 404 and the fourth circuit 406 have similar structures to the first and second circuits 400 and 402 except the third circuit 404 has a first CM/exclusive OR gate 436 and a second CM/exclusive OR gate 438 in the third stage 416, and the fourth circuit 406 has a first CM/exclusive OR gate 440 and a second CM/exclusive OR gate 442 in the fourth stage 418. All of the other stages of the first and second rails 408 and 410 of the third and fourth circuits 404 and 406 include inverters 444 and 446, respectively. As with the second circuit 402, each of the CM/exclusive OR gates 436, 438, 440 and 442 are coupled to the inverter 444 and 446, respectively, of the preceding stage and to the CM/exclusive OR gate 428, 430, 436 or 438 in the corresponding first or second rail 408 or 410 of the preceding circuit. The fourth stage 418 of each of the third and fourth circuits 404 and 406 are coupled to respective 2:1 multiplexers 426C and 426D. The multiplexers 426C and 426D will then select between the conditional sums ($sum_{i+2,0}$ or $sum_{i+2,1}$ and $sum_{i+3,0}$ or $sum_{i+3,1}$) to provide the final sums, $sum_{i+2}$ and $sum_{i+3}$, in response to the appropriate 1 in 4 carry as a function of the order of the bits being summed as shown in FIG. 1. For example, for final sums, Sum(63:60), the 1 in 4 carry or $carry_{in}$ is $C_{59}$ from FIG. 1. For final sums, Sum(31:28), the 1 in 4 carry is $C_{27}$ and so forth for the other final sums.

Figure 5:
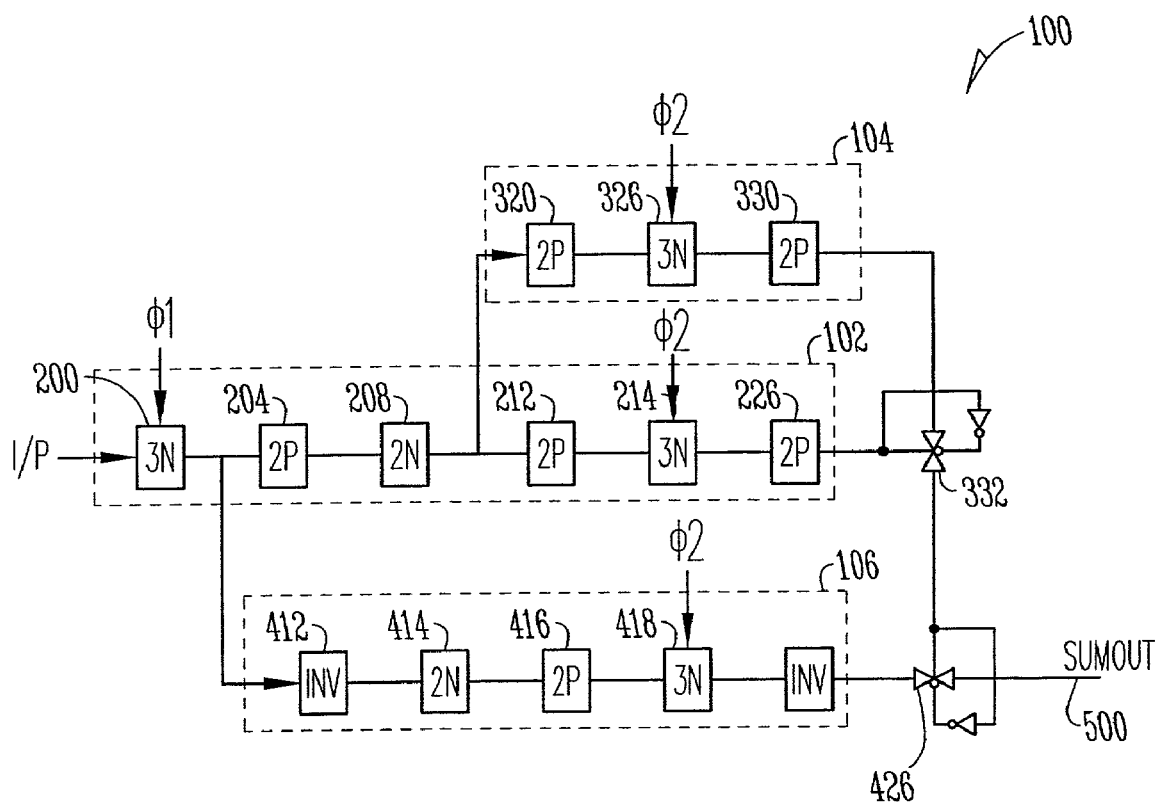
FIG. 5 is a block schematic diagram illustrating the critical path of the 64 bit quarternary-tree adder of FIG. 1.

FIG. 5 is a block schematic diagram illustrating the critical path of the 64 bit quarternary-tree adder 100 of FIG. 1. The number of transistors or gates in a summation path 500 from an input I/P to a SUMOUT for each stage of the sparse carry-merge circuit 102, the intermediate carry generator 104 and the sum generator 106 are shown by the numbers in each block representing each of the stages. For example, the number in the block of the first stage 200 of the sparse carry-merge circuit 102 is "3N" representing 3 N-channel transistors in the first stage 200. The critical path for the adder 100 of the present invention will be the sparse carry-merge circuit 102 and the multiplexers 332 and 426 because the 1 in 16 carries generated by the sparse carry-merge circuit 102 are needed first and are used by the multiplexers 332 and 426 to select between the conditional carries and the conditional sums in the intermediate carry generators 104 and the conditional sum generators 106. The number of transistors in the critical path provides a relative indication of the speed and efficiency of the adder 100 when compared to the critical paths of other more complex adders with more transistors in the critical path because each transistor or device in the critical path represents a certain amount of delay.

Figure 6:
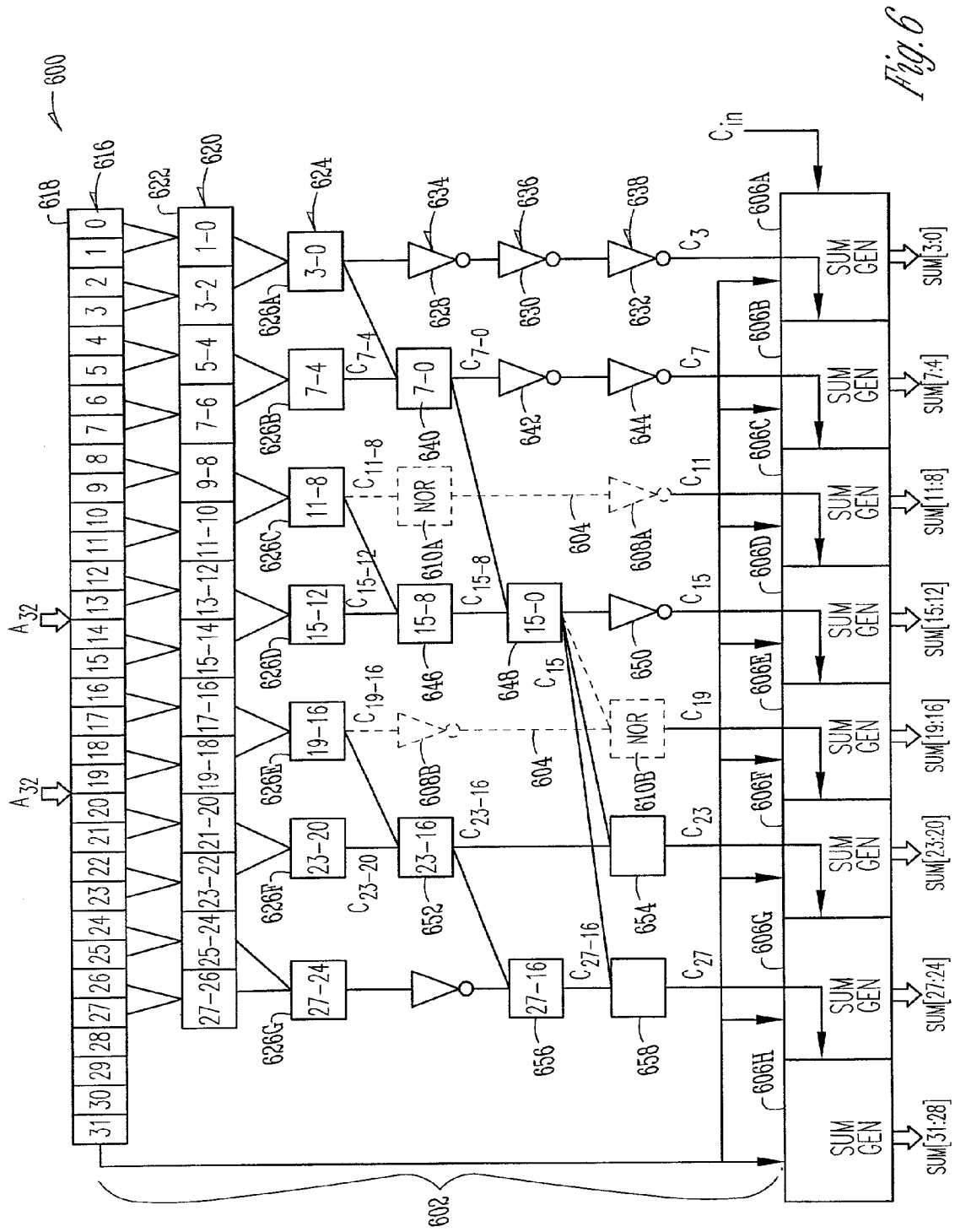
FIG. 6 is a block schematic diagram of a 32 bit quarternary-tree adder in accordance with the present invention.

FIG. 6 is a block schematic diagram of a 32 bit quarternary-tree adder 600 in accordance with the present invention. The adder 600 includes seven stages. The first six stages forming a combination sparse carry-merge circuit 602 and an intermediate carry generator 604 shown by broken lines in FIG. 6. The seventh stage includes a plurality of conditional sum generators 606A–H. The sparse carry-merge circuit 602 defines a first circuit adapted to generate a first group of a predetermined number of carries or 1 in 8 carries, $C_7$, $C_{15}$ and $C_{23}$ and the intermediate carry generator 604 forms at least a portion of a second circuit or group of circuits defined below to generate a second predetermined number of carries or the additional missing 1 in 4 carries $C_3$, $C_{11}$, $C_{19}$ and $C_{27}$. The missing 1 in 4 carries $C_{11}$ and $C_{19}$ may each be generated using an inverter 608A and 608B and a two input NOR gate 610A and 610B.

As with the 64 bit adder 100 (FIG. 1), the first stage 616 of the 32 bit adder 600 includes a plurality of logic gates 618 represented by the blocks in the first stage 616 to generate a plurality of propagate signals $P_i$ (where i=0 to 32) and a plurality of generate signals $G_i$ (where i=0 to 32). The logic gates 618 each perform an "exclusive OR" logic operation on each pair of the bits 0–32 of the binary numbers $A_{32}$ and $B_{32}$ to generate the plurality of propagate signals ($P_i = A_i \oplus B_i$) and an "AND" logic operation on each pair of bits of the two binary numbers $A_{32}$ and $B_{32}$ to generate the plurality of generate signals ($G_i = A_i \cdot B_i$). The second stage 620 includes a plurality of CM logic gates 622. Each CM logic gate 622 merges the propagate signals ($P_i$ and $P_{i-1}$) and the generate signals ($G_i$ and $G_{i-1}$) from two adjacent logic gates 618 of the first stage 616. The third stage 624 includes a plurality of CM logic gates 626. Each CM logic gate 626 merges the propagate signals and the generate signals from two adjacent logic gates 622 of the second stage 620. The 1 in 4 carry $C_3$ is then generated by passing the output generate signal $G_{3-0}$ from CM logic gate 626a through inverters 628, 630 and 632 of the fourth stage 634, fifth stage 636 and sixth stage 638 respectively. The carry $C_3$ is then inputted to sum generator 606b.

The 1 in 8 carry $C_7$ is generated by merging $C_{7-4}$ and $C_3$ in CM logic gate 640 in the fourth stage 634. The output of CM logic gate 640 is then passed through inverters 642 and 644 in the fifth and sixth stages 636 and 638 respectively to provide $C_7$ which is inputted to the sum generator 606C.

The carry $C_{15}$ is generated by merging $C_{15-12}$ and $C_{11-8}$ in a CM logic gate 646 in the fourth stage 634 to provide merged carry $C_{15-8}$. The carry $C_{15-8}$ is then merged with the carry $C_{7-0}$ in CM logic gate 648 in the fifth stage 636. The output of CM logic gate 648 is then passed through an inverter 650 to provide the carry $C_{15}$ which is inputted to sum generator 606E.

The carry $C_{23}$ is generated by merging $C_{23-20}$ from a CM logic gate 626F and $C_{19-16}$ from a CM logic gate 626E, both in the third stage 624, in a CM logic gate 652 in the fourth stage 634. The output carry $C_{23-16}$ is then merged with the carry $C_{15-0}$ from the CM logic gate 648 in the fifth stage 636 in a CM logic gate 654 in the sixth stage 638 to provide the carry $C_{23}$ which is inputted into the sum generator 606G.

The carry $C_{27}$ is generated by using two additional carry-merge (CM) gates 656 and 658. The first CM gate 656 generates a merged carry $C_{27-16}$ and the second CM gate 658 merges the carry $C_{15}$ from the CM gate 648 and the carry $C_{27-16}$ to generate the carry $C_{27}$ which is inputted into the sum generator 606H.

Figure 7:
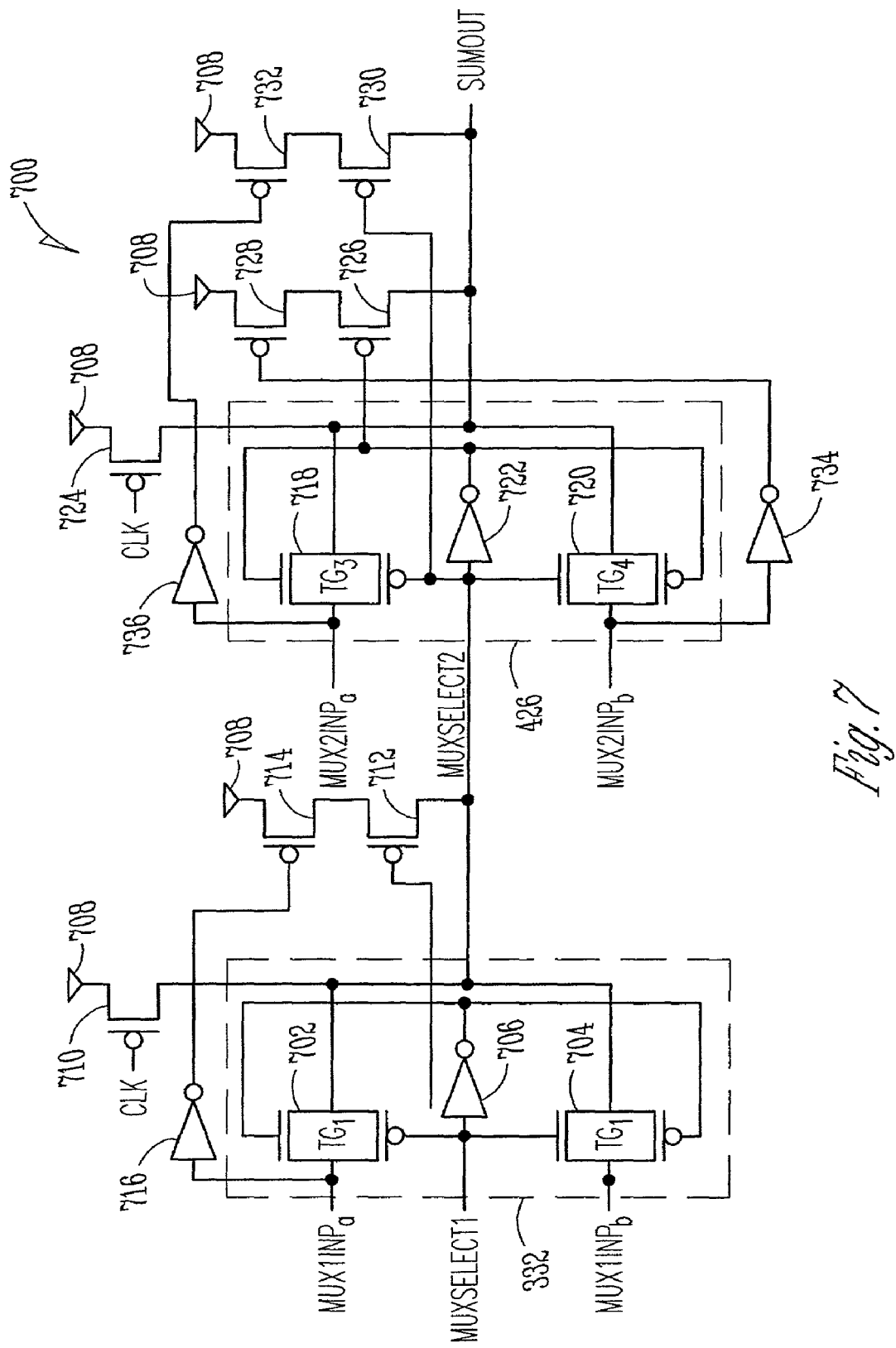
FIG. 7 is a schematic diagram of a multiplexer recovery circuit in accordance with the present invention.

FIG. 7 is a schematic diagram of an example of a multiplexer recovery circuit 700 for use with the 64 bit adder circuit 100 or the 32 bit adder circuit 600 in accordance with the present invention. The multiplexer recovery circuit 700 is described with respect to the 64 bit adder 100 of FIG. 1; although, the multiplex recovery circuit 700 may be adapted for use with the 32 bit adder circuit 600 of FIG. 6 as well or any adder that uses multiplexers to select between conditional values or states. The multiplexer recovery circuit 700 is coupled to each multiplexer 332 of each intermediate carry generator 104 (FIG. 3) and each multiplexer 426 of each sum generator 106 (FIG. 4) to correct for any erroneous discharge or change of state of the 1 in 16 carries or 1 in 4 carries used by the first and second multiplexers 332 and 426 respectively to select between the first or second input signals (or rails) to the multiplexers 332 and 426 or to correct the output sum if it should be erroneously discharged or altered. In FIG. 7, a first input signal from a first rail 306 (FIG. 3) would be coupled to a first input MUS1INP$_a$ of the multiplexer 332 and a second input signal from a second rail 308 (FIG. 3) would be coupled to the a second input MUX1INP$_b$ of the multiplexer 332. The 1 in 16 carry$_{in}$ from the sparse carry-merge circuit 102 would be coupled to a MUXSELECT1 input of the multiplexer 332. The first input MUS1INP$_a$ is coupled to a first transmission gate 702 of the multiplexer 332 and the second input MUX1INP$_b$ is coupled to a second transmission gate 704 of the multiplexer 332. The MUXSELECT1 input is connected to a P-channel gate of the first transmission gate 702 and to an N-channel gate of the second transmission gate 704 and to an inverter 706. The output of the inverter 706 is connected to an N-channel gate of the first transmission gate 702 and to a P-channel gate of the second transmission gate 704. The outputs of the first and second transmission gates 702 and 704 are coupled to the input MUXSELECT2 of the second multiplexer 426. Accordingly, the first transmission gate 702 is activated when MUXSELECT1 is low to connect the first input MUX1INP$_a$ to an output (MUXSELECT2) of the multiplexer 332 and the second transmission gate 704 is activated when MUXSELECT1 is high to connect the second input MUX1INP$_b$ to the output of the first multiplexer 332. The outputs of the first and second transmission gates 702 and 704 are also coupled to a voltage supply 708 by a P-channel metal oxide semiconductor (PMOS) transistor 710. The operation of the PMOS transistor 710 is controlled by a clock, Clk, coupled to a gate of the PMOS transistor 710. A low clock pulse (Clk low) will activate the PMOS transistor 710 and pre-charge MUXSELECT2 to a high signal or high state. MUXSELECT2 is also coupleable to the supply voltage 708 by two series connect PMOS transistors 712 and 714. A gate of the PMOS transistor 712 is coupled to MUXSELECT1 and a gate of the PMOS transistor 714 is coupled to the input MUX1INP$_a$ of the first transmission gate 702 by an inverter 716. Accordingly, MUXSELECT1 going low and MUX1INP$_a$ going high will activate the PMOS transistors 712 and 714 to also pre-charge MUXSELECT2 or hold MUXSELECT2 high.

MUXSELECT2 is coupled to a P-channel gate of a first transmission gate 718 of the second multiplexer 426 and to an N-channel gate of a second transmission gate 720 of multiplexer 426. MUXSELECT2 is also coupled to an inverter 722 that couples MUXSELECT2 to an N-channel gate of the first transmission gate 718 and to a P-channel gate of the second transmission gate 720. Accordingly, when MUXSELECT2 is low, the first transmission gate 718 is activated to connect an input MUX2INP$_a$ to the output SUMOUT of the multiplexer recovery circuit 700 and when MUXSELECT2 is high, the second transmission gate 720 is activated to connect an input MUX2INP$_b$ to the output SUMOUT of the multiplexer recovery circuit 700. The inputs MUX2INP$_a$ and MUX2INP$_b$ represent the first and second rails 408 and 410 respectively of one of the conditional sum generator circuits 400, 402, 404 or 406 of FIG. 4. The output SUMOUT of the second multiplexer 426 is coupleable to the voltage supply 708 by a PMOS transistor 724. A gate of the PMOS transistor 724 is coupled to the clock, CLK. Accordingly, when the clock is low (CLK goes low) the transistor 724 will turn on to connect the voltage supply 708 to the output SUMOUT of the multiplexer 426. SUMOUT is also connectable to the supply voltage 708 by series connected PMOS transistors 726 and 728 or series connected PMOS transistors 730 and 732. A gate of the first PMOS transistor 726 is connected to the inverter 722 to control operation of the transistor 726, and a gate of the second PMOS transistor 728 is connected to an inverter 734 which in turn is connected to the second input MUX2INP$_b$ of the second multiplexer 426. Thus, when MUXSELECT2 and MUX2INP$_b$ are both high, the transistors 726 and 728 are turned on or activated to connect the output SUMOUT to the supply voltage 708.

A gate of the third PMOS transistor 730 is coupled to MUXSELECT2 to control operation of the PMOS transistor 730, and a gate of the fourth PMOS transistor 732 is coupled to the inverter 736 which in turn is connected to the first input MUX2INP$_a$. Therefore, when MUXSELECT2 is low and MUX2INP$_a$ is high, SUMOUT is connected to the supply voltage 708 to pre-charge the output, SUMOUT.

In operation, CLK goes low or to a low state to activate the transistors 710 and 724 to cause MUXSELECT2 and SUMOUT to be pre-charged high or to a high state. The CLK will go high to turn off the transistors 710 and 724 to begin an evaluation of the inputs MUX1INP$_a$ and MUX1INP$_b$ to the first multiplexer 332 and MUX2INP$_a$ and MUX2INP$_b$ to the second multiplexer 426. As soon as the CLK goes high, MUXSELECT2 having been pre-charged high will activate the second transmission gate 720 of the second multiplexer 426 and SUMOUT will assume the value of MUX2INP$_b$. This may or may not be the correct value or state for SUMOUT because the correct value of MUXSELECT2 will only be resolved after MUXSELECT1 is determined and the correct or true input MUX1INP$_a$ or MUS1INP$_b$ to the first multiplexer 332 is selected to be coupled to the output (MUXSELECT2). The problem is that the CLK can go high before MUXSELECT1 is determined or correctly resolved. Depending upon the value or state of MUXSELECT1 at the instant the CLK goes high or at any time before MUXSELECT1 is properly resolved, MUXSELECT2 may be coupled to the incorrect input, either MUX1INP$_a$ or MUX1INP$_b$, and therefore evaluated or resolved incorrectly. To insure that MUXSELECT2 is resolved correctly, The PMOS transistors 712 and 714 will detect the input signals MUXSELECT1 and MUX1INP$_a$ coming into the first multiplexer 332 before the transmission gates 702 and 704 resolve the correct value or state for MUXSELECT2. The PMOS transistors 712 and 714 will either be activated to bring MUXSELECT2 to a high state or will remain off so that MUXSELECT2 remains at the value or state it becomes after CLK goes high.

Similarly, the instant CLK goes high, SUMOUT will assume the value or state of MUX2INP$_b$ because MUXSELECT2 is pre-charge high by the PMOS transistor 710 and the second transmission gate 720 of the second multiplexer 426 will be active when CLK goes high to turn off PMOS transistor 710. MUX2INP$_b$ may or may not be the correct value or evaluation for SUMOUT since MUXSELECT2 has not been properly evaluated or determined. Accordingly, after MUXSELECT1 has been properly resolved and MUX- SELECT2 properly determined, the PMOS transistors 726 and 730 detect the proper value or true evaluation of MUXSELECT2; the PMOS transistor 728 detects the value or state of the input MUX2INP$_b$ and the PMOS transistor 732 detects the value or state of the input MUX2INP$_a$ before the transmission gates 718 and 720 properly resolve the true or correct value for SUMOUT. Depending upon the states detected, either the PMOS transistors 726 and 728 or the PMOS transistors 730 or 732 will be activated to pre-charge the output SUMOUT or the transistors 726, 728, 730 and 732 will remain inactive so that SUMOUT remains at the same state or value it assumes between the time CLK goes high and when SUMOUT is properly evaluated or resolved. Accordingly, the multiplexer recovery circuit 700 insures that the output sum or SUMOUT from each of the conditional sum generators 106 is correctly resolved. The multiplexer recovery circuit 700 enables a single-rail dynamic implementation of the adder core 100.

Figure 8:
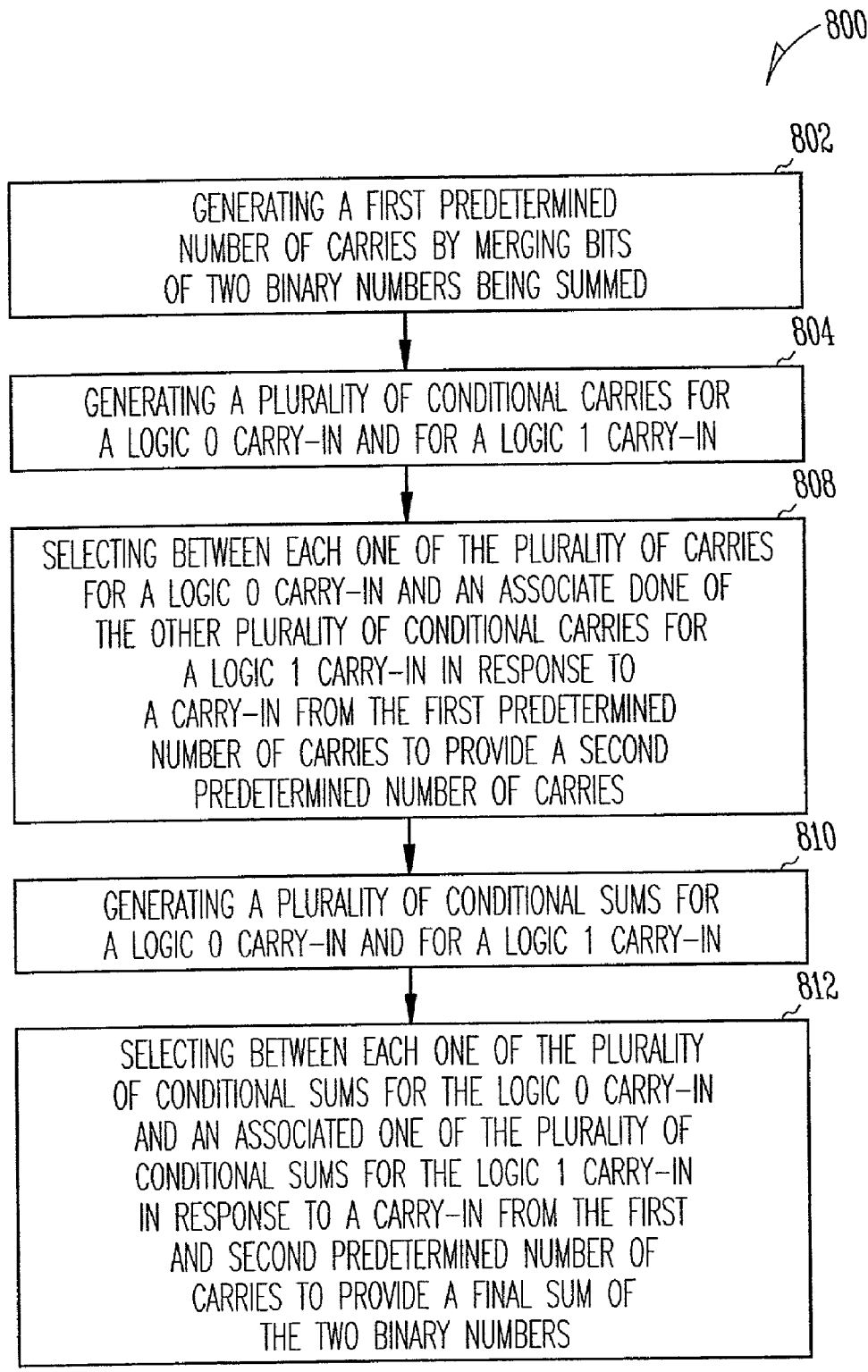
FIG. 8 is a flow chart of the method of operation of the quarternary-tree adder in accordance with the present invention.

FIG. 8 is a flow chart of a method 800 of operation of a quarternary-tree adder 100 in accordance with the present invention. In step 802, a first predetermined number of carries, such as 1 in 16 carries for a 64 bit adder 100 or 1 in 8 carries for a 32 bit adder, are generated by merging bits of two binary number. In step 804, a plurality of conditional carries are generated assuming a logic 0 carry-in signal and a second plurality of conditional carries are generated assuming a logic 1 carry-in signal. A selection is made between each of the plurality of conditional carries generated assuming a logic 0 carry-in and an associated or corresponding conditional carry assuming a logic 1 carry-in in step 808. The selection is made in response to or using one of the first predetermined number of carries to provide a second predetermined number of carries, such as missing carries from the first predetermined number of carries to provide 1 in 4 carries or 1 carry for every group of 4 bits of the two binary numbers being summed, grouping from a least significant digit. In step 810, a plurality of conditional sums are generated assuming a logic 0 carry-in and a second plurality of conditional sums are generated assuming a logic 1 carry-in. In step 812, a selection is made between each one of the conditional sums for the logic 0 carry-in and an associated one of the plurality of conditional sums for a logic 1 carry-in to provide a final sum of the two binary numbers. The selection is made in response to or using a carry-in from the first and second predetermined numbers of carries, such as the 1 in 4 carries which also includes the 1 in 16 carries for a 64 bit adder or 1 in 8 carries for a 32 bit adder.

Figure 9:
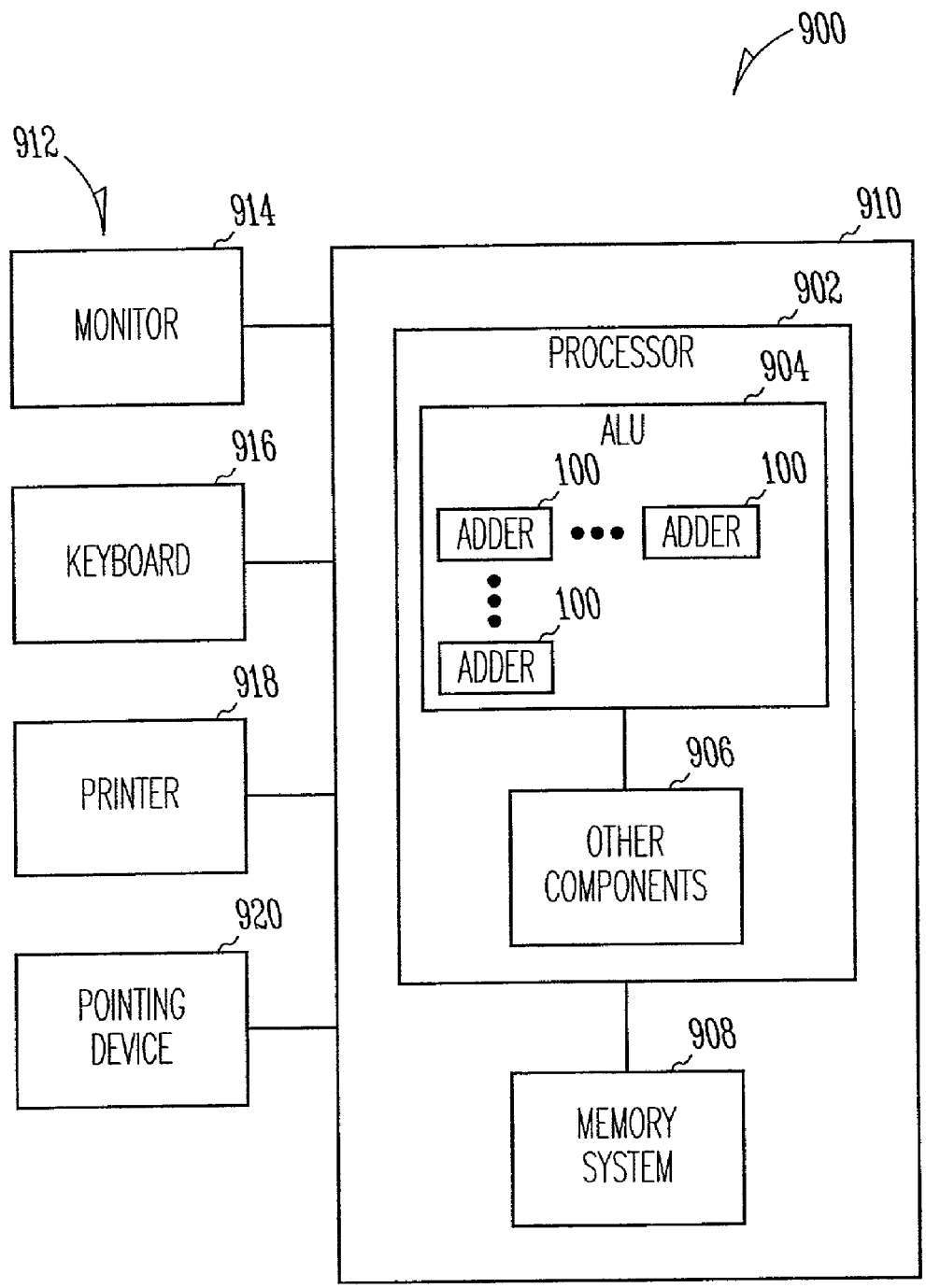
FIG. 9 is a block schematic diagram of an example of an electronic system that incorporates the quarternary-tree adder of the present invention.

FIG. 9 is a block schematic diagram of an example of an electronic system 900, such as a computer system or the like, that incorporates the 64 bit quarternary-tree adder 100 (FIG. 1) or the 32 bit adder 600 (FIG. 6) in accordance with the present invention. The electronic system 900 includes a processor 902, central processing unit (CPU) or the like. The processor 902 includes at least one arithmetic logic unit (ALU) 904 to perform calculations on integer numbers. To perform these arithmetic calculations, the ALU 904 will contain a plurality of 64 bit adders 100 (FIG. 1) or 32 bit adders 600 (FIG. 6). It will be appreciated that the processor 902 will also include other components 906, such as a floating point math unit for calculations involving floating point number, cache memories, buffer interface units, buffers and fetch/decode units to name of few examples of other components 906. The processor 902 is coupled to at least one memory system 908 to store programs and other information. The processor 902 and memory system 908 may be contained in a housing or computer unit 910. Depending upon the function and features of the electronic or computer system 900, other components (not shown) may be contained in the unit 902.

The electronic or computer system 900 will also usually include user interface equipment 912 coupled to the processor 902 and memory system 908 to control the operation of the system 900. Examples of user interface equipment 912 depicted in FIG. 9 are a monitor 914, a keyboard 916, a printer 918, and a pointing device 918 or mouse.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. An adder to sum two binary numbers, comprising:
    a first circuit having a plurality of carry-merge stages connected in a series, the first circuit adapted to generate a group of carries, the group of carries including a final carry generated by a final stage of the series, a first carry generated by a first stage of the series and a second carry generated by one of the plurality of stages of the series located between the first and final stages of the series;
    a second circuit connected to the first circuit and having a plurality of stages, the second circuit connected to receive the final carry and the second carry and adapted to produce a pair of conditional carry, the second circuit adapted to generate additional carries missing from the group of carries to provide one carry for every group of a predetermined number of bits of the two binary numbers;
    at least one sum generator connected to the first circuit and the second circuit and connected to receive the first carry and one of the pair of conditional carry, the sum generator adapted to generate a pair of conditional sums; and
    at least one device adapted to select between the pair of conditional sums in response to one of the group of carries.

2. The adder of claim 1, wherein the second circuit is further comprising an other device to select between the two conditional carries to provide each additional carry in response to one of the group of carries.

3. An adder to sum two binary numbers, comprising:
    a first circuit having a plurality of carry-merge stages connected in a series, the first circuit adapted to generate a group of carries, the group of carries including a final carry generated by a final stage of the series, a first carry generated by a first stage of the series and a second carry generated by one of the plurality of stages of the series located between the first and final stages of the series;
    a second circuit connected to the first circuit and having a plurality of stages, the second circuit connected to receive the final carry and the second carry and adapted to produce a pair of conditional carry, the second circuit adapted to generate additional carries missing from the group of carries to provide one carry for every group of a predetermined number of bits of the two binary numbers and wherein the second circuit is further comprising an other device to select between the two conditional carries to provide each additional carry in response to one of the group of carries;

at least one sum generator connected to the first circuit and the second circuit and connected to receive the first carry and one of the pair of conditional carry, the sum generator adapted to generate a pair of conditional sums; and at least one device adapted to select between the pair of conditional sums in response to one of the group of carries.

4. The adder of claim of claim 3, wherein the at least one device and the other device are each multiplexers.

5. The adder of claim 4, further comprising a multiplexer recovery circuit coupled to each of the multiplexers.

6. The adder of claim 3, wherein the at least one second circuit is an intermediate carry generator.

7. The adder of claim 3, wherein the at least one circuit is a sparse carry-merge circuit.

8. An adder to sum two binary numbers, comprising:
a sparse carry-merge circuit adapted to generate a first predetermined number of carry signals, the carry signals including a final carry signal generated by a final merge-carry stage of the sparse carry-merge circuit, a first carry signal generated by a first stage of the sparse carry-merge circuit and a second carry signal generated by one of a plurality of merge-carry stages connected in series between the first and final stages of the series in the sparse carry-merge circuit;
a plurality of intermediate carry generators each coupled to the sparse carry merge circuit and adapted to receive the final carry signal and the second carry signal and adapted to generate a second predetermined number of carry signals missing from the group of carries to provide one carry signal for every group of a predetermined number of bits of the two binary numbers, including of a first and a second intermediate conditional carry signal;
a plurality of selection circuits connected to the plurality of intermediate carry generators and adapted to select between one of a first and a second intermediate conditional carry signals; and
a plurality of conditional sum generators coupled to receive the first carry signal and the one of the first and the second intermediate conditional carry signals from the sparse carry-merge circuit and the plurality of selection circuits and adapted to provide a conditional sum of the two binary numbers.

9. The adder of claim 8, wherein the sparse carry-merge circuit merges groups of sixteen bits of the two binary numbers and the first predetermined number of carry signals is one carry signal from each group.

10. The adder of claim 8, wherein the sparse carry-merge circuit merges groups of eight bits of the two binary numbers and the first predetermined number of carry signals is one carry signal from each group.

11. The adder of claim 8, wherein the second predetermined number of carry signals is one carry signal for each group of four merged bits of the two binary numbers.

12. The adder of claim 8, wherein the sparse-carry merge circuit includes a the plurality of stages, each stage including a plurality of carry-merge logic gates to combine adjacent output signals from a preceding stage to provide the first predetermined number of carry signals.

13. The adder of claim 8, wherein the sparse-carry merge circuit comprises:
a first stage adapted to generate a plurality of first propagate signals and a first generate signal associated with each first propagate signal by merging the first binary number with the second binary number;
a second stage adapted to generate a plurality of second propagate signals and a second generate signal associated with each second propagate signal by merging adjacent pairs of each of the first propagate signals and each of the associated first generate signals;
a third stage adapted to generate a plurality of third propagate signals and a third generate signal associated with each third propagate signal by merging adjacent pairs of each of the second propagate signals and each of the associated second generate signals;
a fourth stage adapted to generate a plurality of fourth propagate signals and a fourth generate signal associated with each fourth propagate signal by merging adjacent pairs of the third plurality of propagate signals and the associated third generate signals;
a fifth stage adapted to generate a plurality of fifth propagate signals and a fifth generate signal associated with each fifth propagate signal by merging adjacent pairs of each of the fourth propagate signals and the associated fourth generate signals; and
a sixth stage adapted to generate the first predetermined number of carry signals by merging each fifth propagate signal and associated fifth generate signal with each fifth generate signal from a carry-merge logic gate of the fifth stage lower in digit order than a carry-merge logic gate of the sixth stage performing the merge operation, wherein a fifth generate signal from a last carry-merge gate in decreasing digit order is inverted to provide one of the first predetermined number of carry signals.

14. The adder of claim 13, wherein each of the third propagate signals and associated third generate signals are coupled to the plurality of intermediate carry generators.

15. The adder of claim 8, wherein each of the plurality of intermediate carry generators comprises three stages of ripple-carry merge gates.

16. The adder of claim 8, wherein each of the plurality of intermediate carry generators comprises a plurality of rail pairs, one rail of each rail pair being adapted to generate a first conditional carry signal for a logic 0 carry being input to the intermediate carry generator and another rail of each rail pair being adapted to generate a second conditional carry signal for a logic 1 carry being input to the intermediate carry generator.

17. The adder of claim 8, further comprising:
a first intermediate carry generator of the plurality of intermediate carry generators, including:
a first circuit adapted to generate a first carry signal of the second predetermined number of carry signals in response to a first merged propagate signal and a first merged generate signal from the sparse carry-merge circuit,
a second circuit adapted to generate a second carry signal of the second predetermined number of carry signals in response to a second merged propagate signal and a second merged generate signal from the sparse carry-merge circuit, and
a third circuit adapted to generate a third carry signal of the second predetermined number of carry signals in response to a third merged propagate signal and a third merged generate signal from the sparse carry-merge circuit;
a second intermediate carry generator of the plurality of intermediate carry generators, including:
a first circuit adapted to generate a fourth carry signal of the second predetermined number of carry signals in response to a fourth merged propagate signal and a fourth merged generate signal from the sparse carry-merge circuit, a second circuit adapted to generate a fifth carry signal of the second predetermined number of carry signals in response to a fifth merged propagate signal and a fifth merged generate signal from the sparse carry-merge circuit, and a third circuit adapted to generate a sixth carry signal of the second predetermined number of carry signals in response to a sixth merged propagate signal and a sixth merged generate signal from the sparse carry-merge circuit;

a third intermediate carry generator of the plurality of intermediate carry generators, including:

a first circuit adapted to generate a seventh carry signal in response to a seventh merged propagate signal and a seventh merged generate signal from the sparse carry-merge circuit, a second circuit adapted to generate an eighth carry signal in response to an eighth merged propagate signal and an eighth merged generate signal from the sparse carry-merge circuit, and a third circuit adapted to generate a ninth carry signal in response to a ninth merged propagate signal and a ninth merged generate signal from the sparse carry-merge circuit; and a fourth intermediate carry generator of the plurality of intermediate carry generators, including:

a first circuit adapted to generate a tenth carry signal in response to a tenth merged propagate signal and a tenth merged generate signal from the sparse carry-merge circuit, a second circuit adapted to generate an eleventh carry signal in response to an eleventh merged propagate signal and an eleventh merged generate signal from the sparse carry-merge circuit, and a third circuit adapted to generate a twelfth carry signal in response to a twelfth merged propagate signal and a twelfth merged generate signal from the sparse carry-merge circuit.

18. The adder of claim 8, wherein each intermediate cater generator comprises a plurality of circuits to each generate a carry signal of the second predetermined number of carry signals, each of the plurality of circuits including:

a first rail adapted to generate a first conditional carry, a second rail adapted to generate a second conditional carry; and a multiplexer adapted to select between the first conditional carry and the second conditional carry.

19. The adder of claim 8, wherein each of the plurality of conditional sum generators comprises a plurality of stages of ripple carry-merge gates and exclusive OR gates.

20. The adder circuit of claim 8, wherein each of the plurality of conditional sum generators comprises:

a first sum circuit including:

a first rail adapted to generate a first sum signal from a first propagate signal, a second rail adapted to generate a second sum signal from the first propagate signal, and a multiplexer adapted to select one of the first sum signal or the second sum signal in response to a first carry signal of the first or second predetermined number of carry signals;

a second sum circuit including:

a first rail adapted to generate a third sum signal, wherein the first rail of the second sum circuit includes a first carry-merge/exclusive OR logic gate to merge a second propagate signal and a second generate signal with a logic 0 carry-in, a second rail adapted to generate a fourth sum signal, wherein the second rail of the second sum circuit includes a second combination carry-merge/exclusive OR logic gate to merge the second propagate signal and the second generate signal with a logic 1 carry-in, and a multiplexer adapted to select between the third sum signal and the fourth sum signal in response to a second carry signal of the first and second predetermined number of carry signals;

a third sum circuit including:

a first rail adapted to generate a fifth sum signal, wherein the first rail of the third sum circuit includes a third carry-merge/exclusive OR logic gate to merge a third propagate signal and a third generate signal with an output generate signal from the first combination carry-merge/exclusive OR logic gate, a second rail adapted to generate a sixth sum signal, wherein the second rail of the third sum circuit includes a fourth combination carry-merge/exclusive OR logic gate to merge the third propagate signal and the third generate signal with an output generate signal from the second combination carry-merge/exclusive OR gate, and a multiplexer adapted to select between the fifth sum signal and the sixth sum signal in response to a third carry signal of the first and second predetermined number of carry signals; and a fourth sum circuit including:

a first rail adapted to generate a seventh sum signal, wherein the first rail of the fourth sum circuit includes a fifth combination carry-merge/exclusive OR logic gate to merge a fourth propagate signal and a fourth generate signal with an output generate signal from the third combination carry-merge/exclusive OR logic gate, a second rail adapted to generate an eighth sum signal, wherein the second rail of the fourth sum circuit includes a sixth combination carry- merge/exclusive OR logic gate to merge the fourth propagate signal and the fourth generate signal with an output generate signal from the fourth combination carry- merge/exclusive OR gate, and a multiplexer adapted to select between the seventh sum signal and the eighth sum signal in response to a fourth carry signal of the first and second predetermined number of carry signals.

21. The adder of claim 8, further comprising a multiplexer recovery circuit coupled to the sparse carry-merge circuit, each of the plurality of intermediate carry generators and each of the plurality of conditional sum generators.

22. An electronic system, comprising:

a processor including an arithmetic logic unit, the arithmetic logic unit including at least one adder and the adder including:

a sparse carry-merge circuit having a plurality of carry-merge stages connected in a series, the sparse carry-merge circuit adapted to generate a group of carries, the group of carries including a final carry generated by a final stage of the plurality of carry-merge series, a first carry generated by a first stage of the plurality of carry-merge stages and a second carry generated by one of the plurality of carry-merge stages of the series located between the first and final stages of the series;

a plurality of intermediate carry generators each coupled to the sparse carry-merge circuit and adapted receive the final carry and the second carry, the plurality of intermediate carry generators adapted to generate additional carries missing from the group of carries to provide one carry signal for every group of a predetermined number of bits of a first and a second binary number, including of a first and a second intermediate conditional carry;

a plurality of selection circuits connected to the plurality of intermediate carry generators and adapted to select between one of the first and the second intermediate conditional carry; and a plurality of sum generators coupled to the sparse carry-merge circuit and the plurality of selection circuits and adapted to provide the sum of two binary numbers; and a memory system coupled to the processor.

23. The electronic system of claim 22, wherein the sparse carry-merge circuit generates at least one carry for every group of sixteen input bits to the adder.

24. The electronic system of claim 22, wherein the sparse carry-merge circuit generates at least one carry for every group of eight input bits to the adder.

25. The electronic system of claim 22, wherein the intermediate carry generator generates at least one carry signal for every group of four input bits to the adder.

26. The electronic system of claim 22, wherein each of the sum generators comprises:

four dual rail sum circuits, each circuit providing one bit of a final sum and one rail generating a conditional sum for a logic 0 carry-in and the other rail generating a conditional sum for a logic 1 carry-in; and a multiplexer coupled to each dual rail sum circuit to select the one or the other rail in response to a one in four carry from the intermediate carry generator.

27. The electronic system of claim 22, further comprising a multiplexer recovery circuit coupled to the sparse carry-merge circuit, each of the plurality of intermediate carry generators and each of the plurality of conditional sum generators.

28. A method of making a processor, comprising:
forming an arithmetic logic unit;
forming at least one adder as a component of the arithmetic logic unit, wherein forming the at least one adder includes:

forming a sparse carry-merge circuit formed to generate a group of carry signals, the carry signals including a final carry signal generated by a final merge-carry stage of the sparse carry-merge circuit, a first carry signal generated by a first stage of the sparse carry-merge circuit and a second carry signal generated by one of a plurality of merge-carry stages connected in series between the first and final stages of the series in the sparse carry-merge circuit;

forming a plurality of intermediate carry generators each coupled to the sparse carry-merge circuit and formed to receive the final carry signal and the second carry signal and formed to generate additional carries missing from the group of carries signals to provide one carry signal for every group of a predetermined number of bits of a first and a second binary number, including of a first and a second intermediate conditional carry signal;

forming a plurality of selection circuits connected to the plurality of intermediate carry generators and formed to select between one of a first and a second intermediate conditional carry signals; and forming a plurality of conditional sum generators coupled to the sparse carry-merge circuit and the plurality of intermediate carry generators and formed to provide the sum of the two binary numbers.

29. The method of claim 28, wherein forming the sparse carry-merge circuit comprises forming a plurality of stages, each stage including a plurality of carry-merge logic gates to combine adjacent outputs from a preceding stage to provide the group of carries.

30. The method of claim 28, wherein forming each of the plurality of intermediate carry generators comprises forming three stages of ripple-carry merge gates.

31. The method of claim 28, wherein forming each of the conditional sum generators comprises:
forming four dual rail sum circuits; and
forming a multiplexer coupled to each dual rail sum circuit.

32. The method of claim 28, further comprising:
forming a multiplexer recovery circuit coupled to the sparse carry-merge circuit, each of the plurality of intermediate carry generators and each of the plurality of conditional sum generators.

* * * * *

UNITED STATES PATENT AND TRADEMARK OFFICE
CERTIFICATE OF CORRECTION

PATENT NO. : 7,188,134 B2  Page 1 of 1
APPLICATION NO. : 09/967240
DATED : March 6, 2007
INVENTOR(S) : Mathew et al.

It is certified that error appears in the above-identified patent and that said Letters Patent is hereby corrected as shown below:

On the Title page, in field (56), under "Other Publications", in column 2, line 3, delete "bianry" and insert -- binary --, therefor.

On the Title page, in field (56), under "Other Publications", in column 2, line 7, delete "crcuits" and insert -- circuits --, therefor.

In column 13, line 9, in Claim 4, before "3" delete "of claim".

In column 13, line 58, in Claim 12, after "includes" delete "a".

In column 15, line 42, in Claim 18, delete "cater" and insert -- carrier --, therefor.

Signed and Sealed this

Twenty-ninth Day of May, 2007

JON W. DUDAS
*Director of the United States Patent and Trademark Office*